(12) United States Patent
Ungar et al.

(10) Patent No.: US 10,654,587 B2
(45) Date of Patent: May 19, 2020

(54) AIRCRAFT FLIGHT CONTROL SURFACE ACTUATION MONITORING SYSTEM AND METHOD

(71) Applicant: The Boeing Company, Chicago, IL (US)

(72) Inventors: Lior Ungar, Lynnwood, WA (US); Timothy J. Soderquist, Marysville, WA (US)

(73) Assignee: The Boeing Company, Chicago, IL (US)

( * ) Notice: Subject to any disclaimer, the term of this patent is extended or adjusted under 35 U.S.C. 154(b) by 687 days.

(21) Appl. No.: 14/850,084

(22) Filed: Sep. 10, 2015

(65) Prior Publication Data

US 2017/0073082 A1 Mar. 16, 2017

(51) Int. Cl.
*B64C 9/22* (2006.01)
*B64D 45/00* (2006.01)

(52) U.S. Cl.
CPC ............ *B64D 45/0005* (2013.01); *B64C 9/22* (2013.01); *B64D 2045/001* (2013.01)

(58) Field of Classification Search
CPC ..................... B64D 45/0005; B64D 2045/001
See application file for complete search history.

(56) References Cited

U.S. PATENT DOCUMENTS

| 5,686,907 A * | 11/1997 | Bedell ................ B64D 45/0005 244/194 |
| 6,466,141 B1 * | 10/2002 | McKay .................. B64C 13/00 244/194 |
| 2007/0102587 A1 | 5/2007 | Jones et al. |
| 2012/0325976 A1 * | 12/2012 | Parker ....................... B64C 9/22 244/203 |
| 2015/0360770 A1 * | 12/2015 | Good ................. B64D 45/0005 244/199.3 |
| 2016/0297541 A1 * | 10/2016 | Anderson ............... F16H 19/04 |

* cited by examiner

*Primary Examiner* — Brian M O'Hara
*Assistant Examiner* — Keith L Dixon
(74) *Attorney, Agent, or Firm* — Walters & Wasylyna LLC

(57) ABSTRACT

A system for monitoring actuation of a flight control surface, the flight control surface being connected to a track that moves the flight control surface between at least a retracted position and an extended position, the system including a rack connected to the track, a pinion engaged with the rack and a rotation detector operatively connected to the pinion.

20 Claims, 8 Drawing Sheets

AIRCRAFT FLIGHT CONTROL SURFACE ACTUATION MONITORING SYSTEM AND METHOD

FIELD

This application relates to actuation monitoring of aircraft flight control surfaces and, more particularly, to skew and loss detection for aircraft flight control surfaces, such as slats.

BACKGROUND

Modern aircraft, including fixed-wing aircraft and rotary-wing aircraft, employ a variety of flight control surfaces, such as ailerons, elevators, rudders, flaps, slats, spoilers, air brakes and the like. By manipulating one or more flight control surfaces, a pilot may control the lift generated by the aircraft, such as during takeoff, climbing, descending and landing, as well as the aircraft's orientation about its pitch, roll and yaw axes. Therefore, effective flight control requires effective monitoring and control of the aircraft's flight control surfaces.

For example, the leading edge of a fixed-wing aircraft typically includes slats that, when actuated, alter the aerodynamic shape of the wing. At cruise, the slats are maintained in a retracted position. However, during takeoff, climbing, descending or landing, the slats may be extended, either partially or fully, thereby effectively increasing the chord length of the wing and augmenting lift. Therefore, the lift generated by the wings of the aircraft is highly dependent upon the position (e.g., retracted; partially extended; fully extended) of the slats vis-à-vis the body of the wing.

Typically, each slat is connected to the body of the associated wing by two or more tracks. Each track is typically mounted on guide rollers and typically includes a rack that is engaged with a rotatable pinion. Therefore, actuation of such a slat is effected by rotation of the pinion, which causes the track to move along a track path, which in turn moves the slat between the retracted position, a partially extended position and the fully extended position.

Slat actuation is often monitored to identify a skew or a loss. A skew occurs when one track associated with a slat has asynchronously moved with respect to one or more other tracks associated with that slat. A loss occurs when one or more tracks associated with a slat fails to extend or retract. Unfortunately, the systems presently used to monitor slat actuation are complex (expensive) and heavy.

Accordingly, those skilled in the art continue with research and development efforts in the field of aircraft flight control surface actuation monitoring.

SUMMARY

In one embodiment, disclosed is a system for monitoring actuation of a flight control surface, the flight control surface being connected to a track that moves the flight control surface between at least a retracted position and an extended position, the system including a rack connected to the track, a pinion engaged with the rack and a rotation detector operatively connected to the pinion.

In another embodiment, disclosed is an aircraft including a flight control surface, a track connected to the flight control surface, wherein the track moves the flight control surface between at least a retracted position and an extended position, a rack engaged with a pinion, wherein the pinion is rotatable about an axis of rotation in response to movement of the rack relative to the pinion, and wherein one of the rack and the pinion is connected to the track, and a rotation detector operatively connected to the pinion.

In yet another embodiment, disclosed is a method for monitoring actuation of a flight control surface, the flight control surface being connected to a track that moves the flight control surface between at least a retracted position and an extended position. The method may include the steps of (1) connecting a rack to the track; (2) engaging a pinion with the rack, wherein the pinion is rotatable about an axis of rotation; and (3) detecting rotation of said pinion.

Other embodiments of the disclosed aircraft flight control surface actuation monitoring system and method will become apparent from the following detailed description, the accompanying drawings and the appended claims.

DETAILED DESCRIPTION

Figure 1:
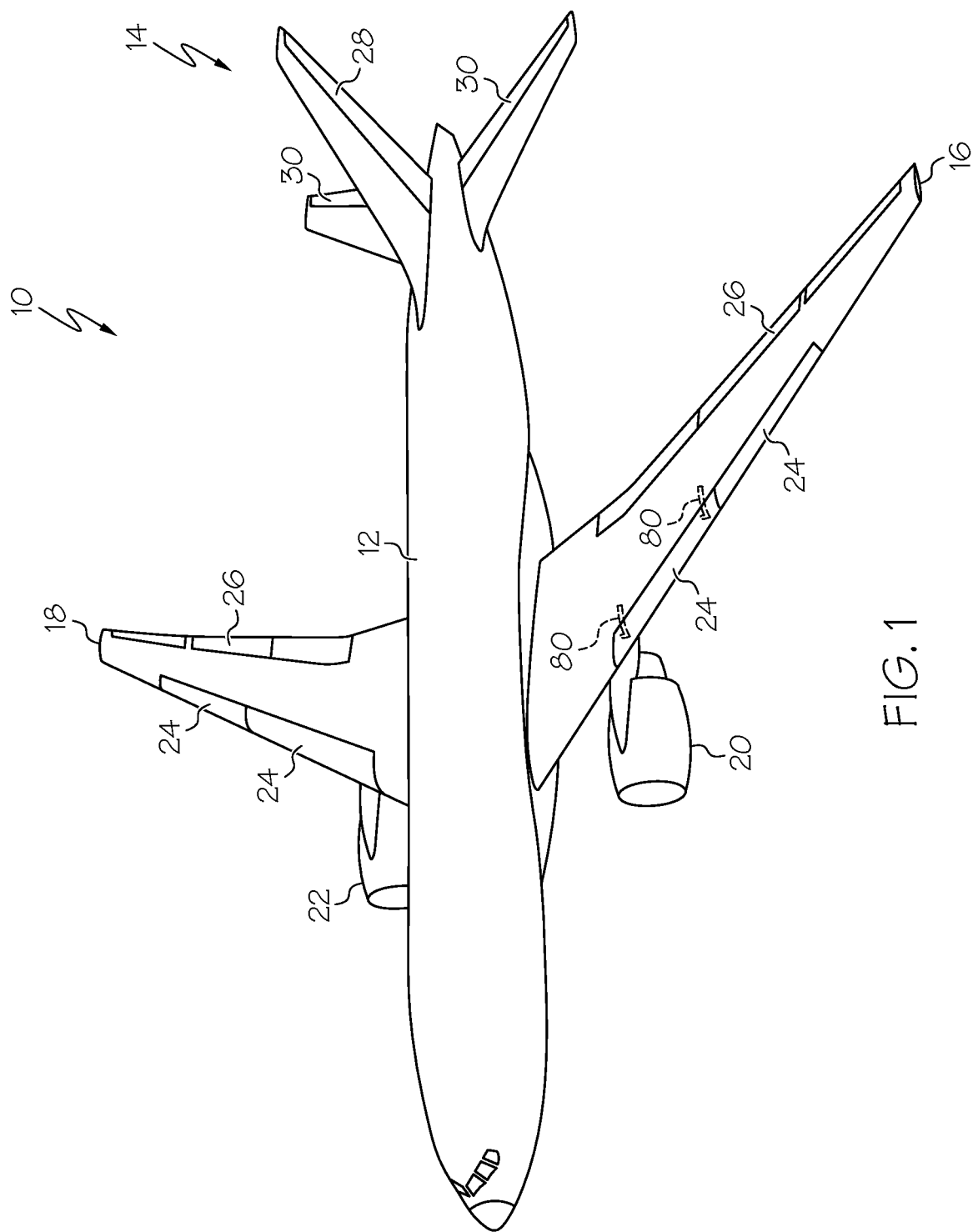
FIG. 1 is a perspective view of an aircraft incorporating the disclosed aircraft flight control surface actuation monitoring system.

Referring to FIG. 1, disclosed is an aircraft, generally designated 10, incorporating the disclosed aircraft flight control surface actuation monitoring system. The aircraft 10 may include a fuselage 12, an empennage 14, wings 16, 18 and propulsion systems 20, 22 (e.g., turbofan engines). Additionally, the aircraft 10 may include one or more flight control surfaces, such as slats 24 and ailerons 26 associated with the wings 16, 18, and a rudder 28 and elevators 30 associated with the empennage 14. Of course, the aircraft 10 may also include various additional components and systems without departing from the scope of the present disclosure.

The following description is presented in the context of slat actuation monitoring on a fixed-wing aircraft. However, the disclosed aircraft flight control surface actuation monitoring system may be used in connection with flight control surfaces other than slats and for aircraft other than fixed-wing aircraft (e.g., rotary-wing aircraft), without departing from the scope of the present disclosure.

Figure 2:
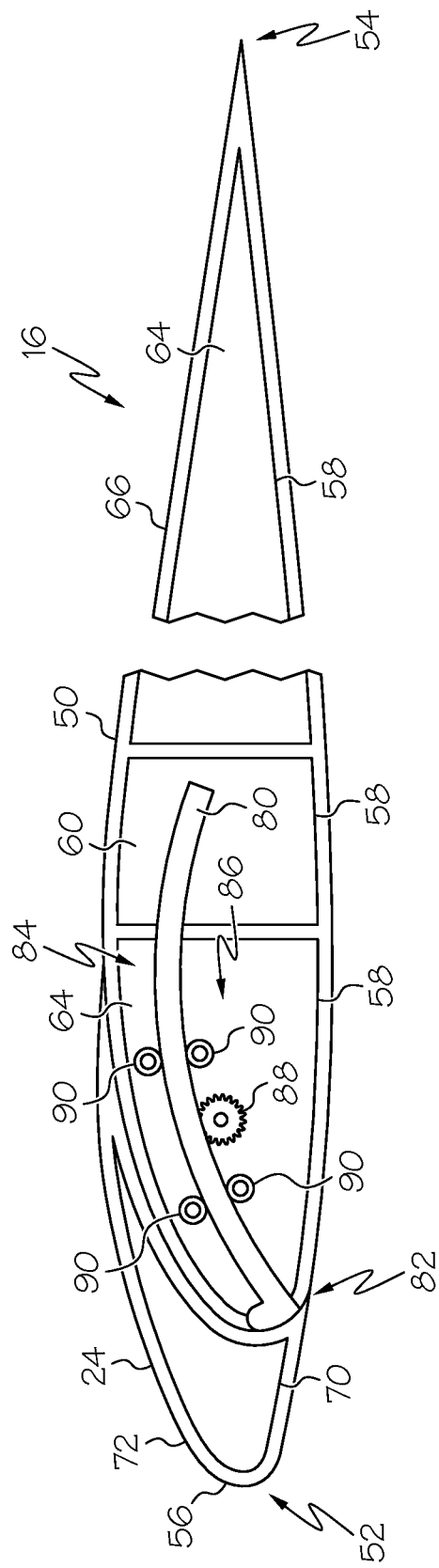
FIG. 2 is a schematic cross-sectional view of a wing of the aircraft of FIG. 1, showing a flight control surface, specifically a slat, in a retracted position.
Figure 3:
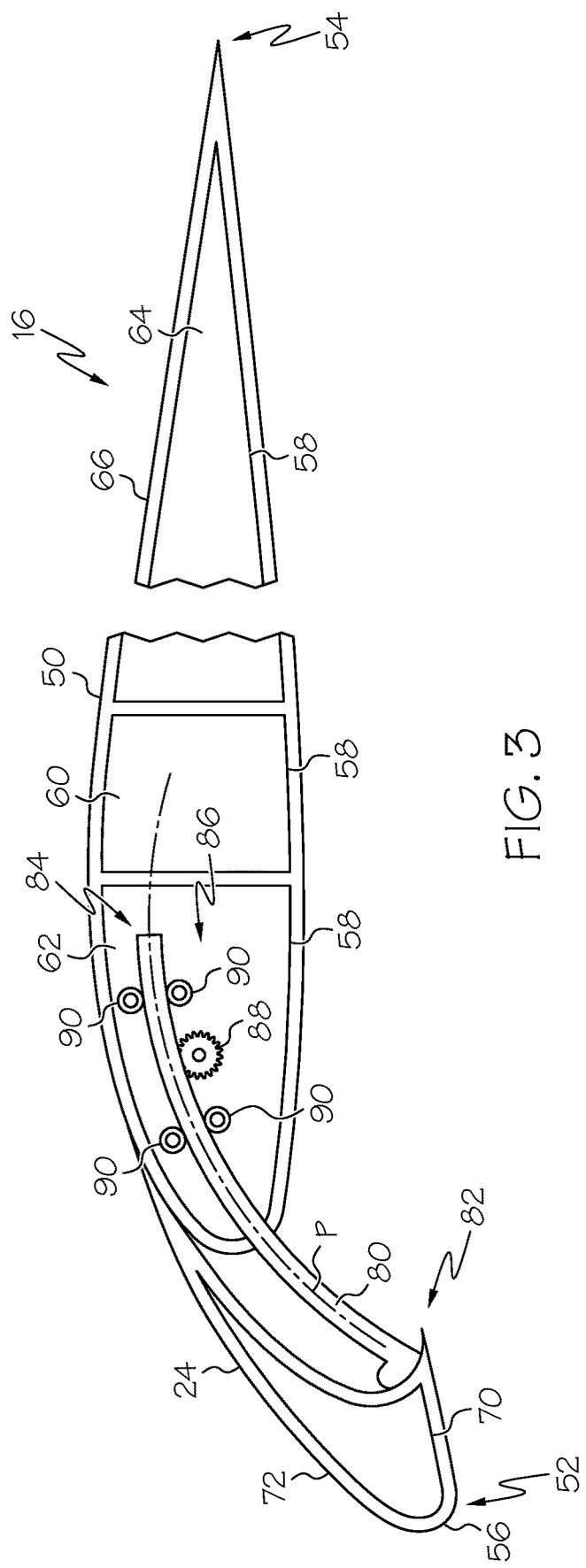
FIG. 3 is a schematic cross-sectional view of the wing of FIG. 2, but with the flight control surface (slat) in an extended position.

Referring to FIGS. 2 and 3, each wing 16, 18 (only wing 16 is shown in FIGS. 2 and 3) of the aircraft 10 (FIG. 1) may have a leading side 52 and a trailing side 54 opposed from the leading side 52, and may include at least a wing body 50 and a slat 24. The slat 24 may be positioned proximate the leading side 52 of the wing body 50, and may define the leading edge 56 of the wing 16. The slat 24 may be moveable relative to the wing body 50 between a retracted position, as shown in FIG. 2, and a fully extended position, as shown in FIG. 3, with various partially extended positions available between the retracted position and the fully extended position.

The wing body 50 may include one or more structural members 58, such as a spar 60, a leading edge rib 62 and a trailing edge rib 64, and a skin 66. The leading edge rib 62 may be connected to the leading side 52 of the spar 60 and the trailing edge rib 64 may be connected to the trailing side 54 of the spar 60. The structural members 58 (e.g., the spar 60, the leading edge rib 62 and the trailing edge rib 64) may be covered, at least partially, by the skin 66.

The slat 24 may include one or more structural members 70 and a skin 72. The skin 72 may at least partially cover the structural member 70.

A track 80 may connect the slat 24 to the wing body 50. Specifically, the track 80 may include a first (e.g., leading) end portion 82 and a second (e.g., trailing) end portion 84. The first end portion 82 of the track 80 may be connected to the structural member 70 of the slat 24 and the second end portion 84 of the track 80 may extend into the wing body 50. Within the wing body 50, the track 80 may be engaged by an actuation system 86 that selectively moves the track 80, and thus the slat 24, relative to the wing body 50.

The actuation system 86 may employ various techniques to move the track 80 relative to the wing body 50 to actuate the slat 24. For example, the actuation system 86 may include a pinion 88 engaged with a rack 89 (see FIG. 5) on the track 80. Rotation of the pinion 88 (e.g., in response to a force supplied by an associated pinion driving motor (not shown)) may be translated into extending/retracting motion of the track 80.

Thus, the actuation system 86 may cause the track 80 to move relative to the wing body 50 in one of two directions, depending on the type of actuation. Guide rollers 90 may engage the track 80 and guide the moving track 80 along a particular track path P (FIG. 3). Therefore, an extending actuation (e.g., rotation of the pinion 88 in a first direction $D_1$ (FIG. 5)) may urge the track 80, and thus the slat 24, outward and away from the wing body 50 (e.g., to the fully extended position shown in FIG. 3), while a retracting actuation (e.g., rotation of the pinion 88 in a second direction D2 (FIG. 5)) may urge the track 80, and thus the slat 24, toward the wing body 50 (e.g., to the retracted position shown in FIG. 2).

Particular configurations, including shape and structure, for the wing body 50 and slat 24 are shown and described merely for context for the disclosed aircraft flight control surface actuation monitoring system. Variations in the configurations for the wing body 50 and/or slat 24 will become readily apparent to those of ordinary skill in the art, and such variations in the configurations will not result in a departure from the scope of the present disclosure.

Figure 4:
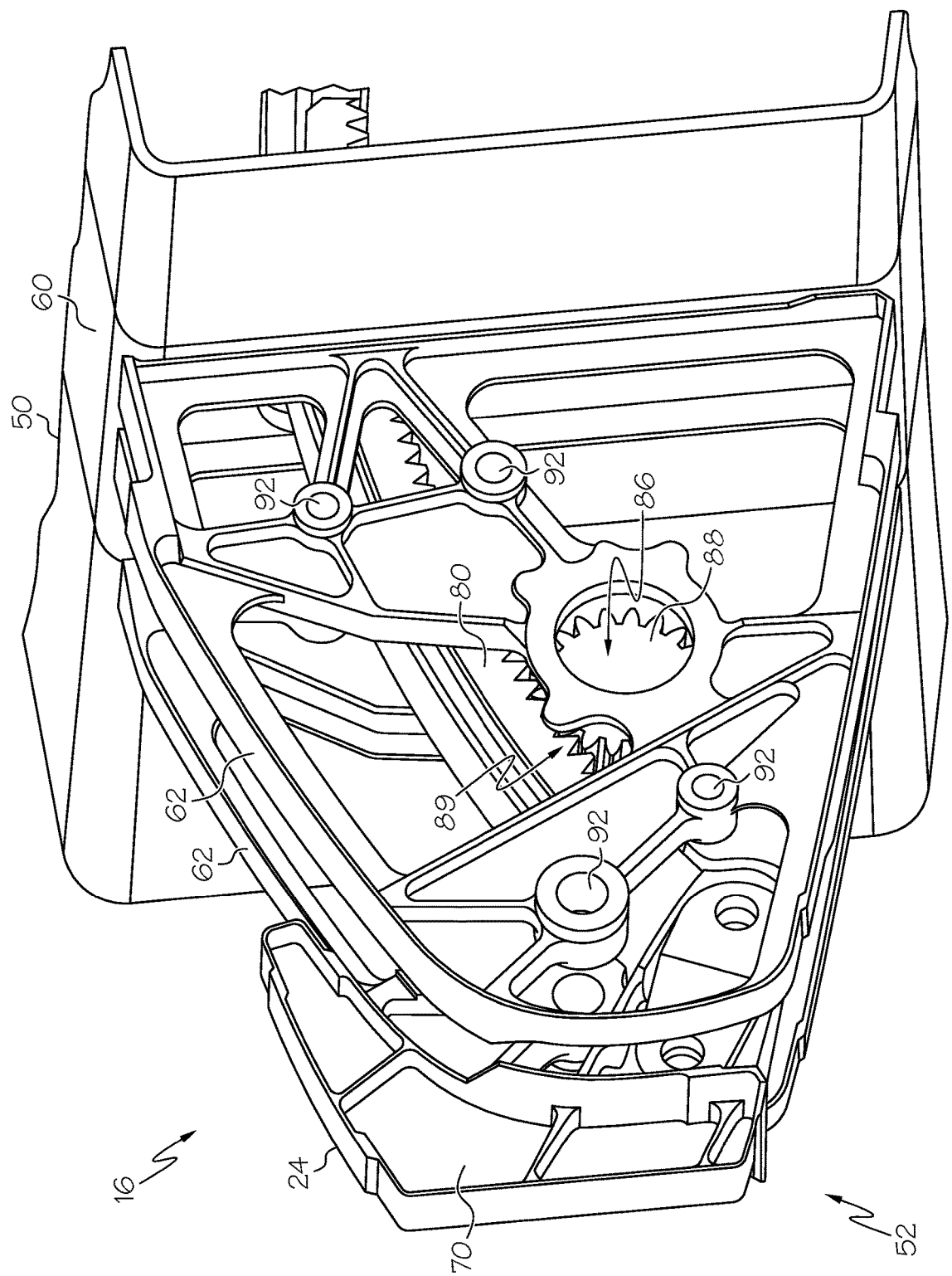
FIG. 4 is a detailed front and side perspective view of a portion of a wing of the aircraft of FIG. 1, shown in a retracted position.
Figure 5:
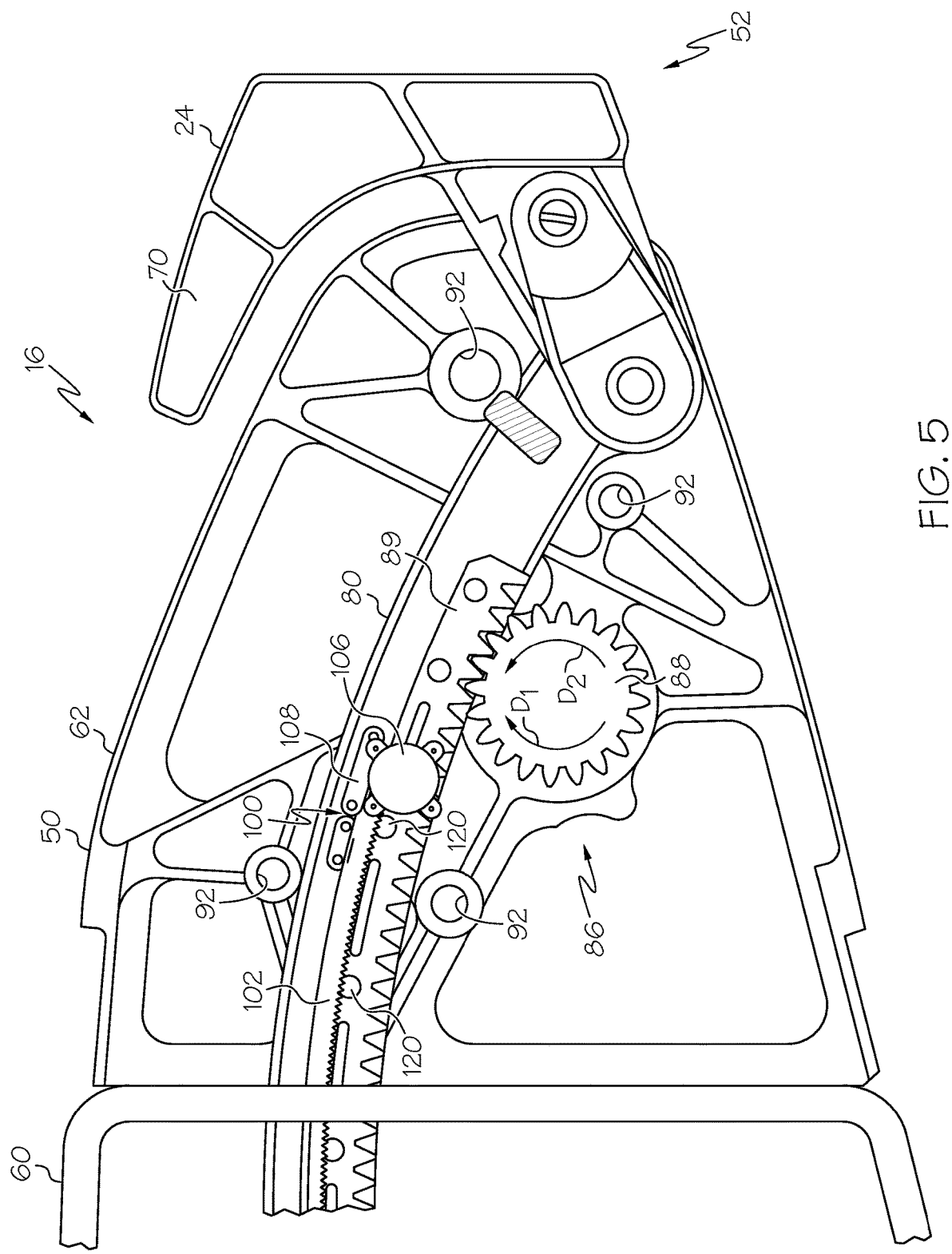
FIG. 5 is a side perspective view of the portion of the wing shown in FIG. 4, but with a portion of the leading edge rib removed to better show the disclosed aircraft flight control surface actuation monitoring system.
Figure 6:
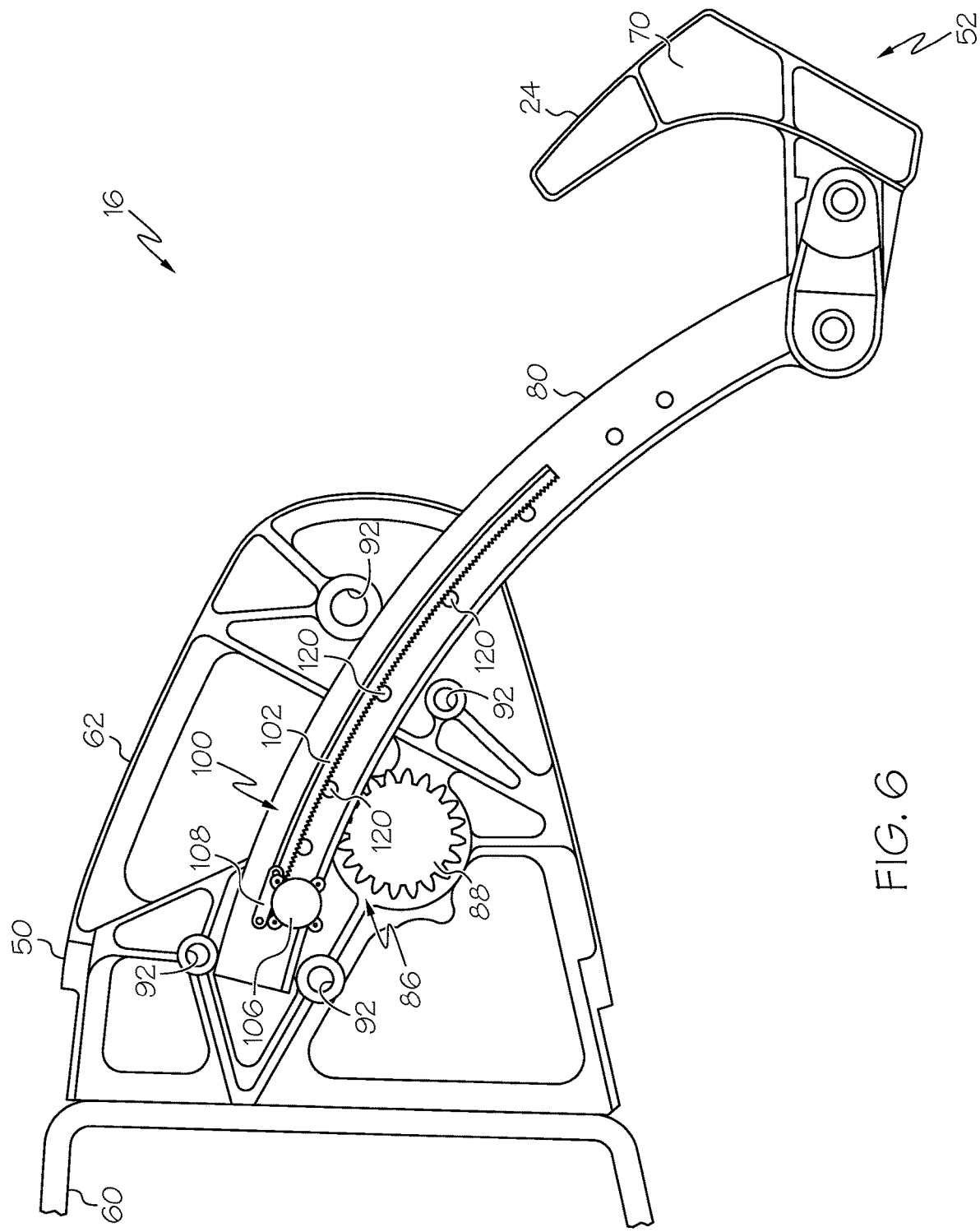
FIG. 6 is a side perspective view of the portion of the wing shown in FIG. 5, but in an extended position.

FIGS. 4-6 illustrate in greater detail the portion of the wing 16 shown in FIGS. 2 and 3, including the slat 24 (structural member 70), the wing body (spar 60 and leading edge rib 62), the track 80, the actuation system 86 (pinion 88 and rack 89) and apertures 92 that support the guide rollers 90 (FIGS. 2 and 3), as well as how the slat 24 extends and retracts relative to the wing body 50. However, FIGS. 4-6 also illustrate how the disclosed aircraft flight control surface actuation monitoring system 100 may be incorporated into the wing 16 of the aircraft 10 (FIG. 1).

Figure 7:
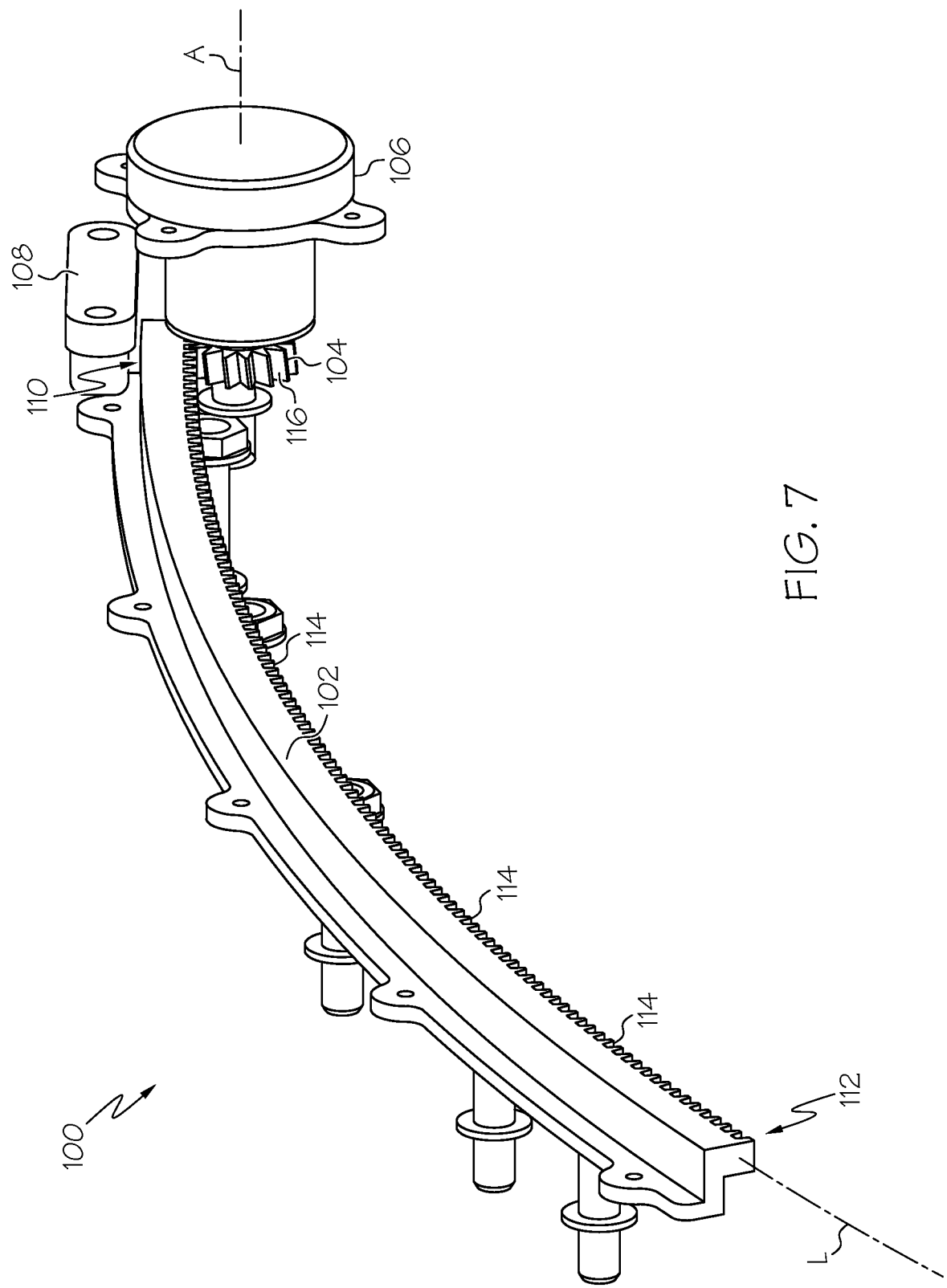
FIG. 7 is a rear and side perspective view of the disclosed aircraft flight control surface actuation monitoring system, shown isolated from the surrounding wing structure shown in FIGS. 4-6.

Referring to FIG. 7, the disclosed aircraft flight control surface actuation monitoring system, generally designated 100, may include a rack 102, a pinion 104 and a rotation detector 106. Optionally, the aircraft flight control surface actuation monitoring system 100 may also include a guide 108, which may be positioned to inhibit disengagement between the rack 102 and the pinion 104. The aircraft flight control surface actuation monitoring system 100 may include various additional components and features, such as additional (e.g., redundant) pinions 104 and/or rotation detectors 106, without departing from the scope of the present disclosure.

The rack 102 may include a first (e.g., forward) end 110 opposed from a second (e.g., trailing) end 112 along a longitudinal axis L. The longitudinal axis L may be linear or curvilinear. The rack 102 may define teeth 114, and the teeth 114 may extend from proximate (at or near) the first end 110 to proximate the second end 112.

The pinion 104 may include teeth 116 extending about its periphery (e.g., circumference). The teeth 116 on the pinion 104 and may be sized and shaped to engage the teeth on the rack 102. Therefore, as the rack 102 moves relative to the pinion 104, the rack 102 causes the pinion 104 to rotate about its axis A of rotation.

The rotation detector 106 may detect angular displacement when the pinion 104 rotates about its axis A of rotation. As shown in FIG. 7, the rotation detector 106 may be operatively connected, but not necessarily physically connected, to the pinion 104. For example, the rotation detector 106 may employ contact-based detection or non-contact-based detection. Therefore, as the pinion 104 rotates about its axis A of rotation, the rotation may be sensed by the rotation detector 106.

Various apparatus and systems, including various combinations, may be used for the rotation detector 106. In one example construction, the rotation detector 106 may be (or may include) a non-contacting rotation detector, such as rotary variable differential transformer (RVDT) or a rotary variable inductive transformer (RVIT).

The rotation detector 106 may output a signal indicative of the rotation of the pinion 104 about the axis A of rotation (angular displacement). The angular displacement signal may in turn provide an indication of the longitudinal displacement of the rack 102 along the longitudinal axis L.

Referring back to FIGS. 4-6, the aircraft flight control surface actuation monitoring system 100 may be incorporated into the wing 16 of the aircraft 10 (FIG. 1). Therefore, the displacement detected by the rotation detector 106 as the rack 102 moves relative to the pinion 104 (FIG. 7) may be indicative of the movement of the track 80 as the track 80 moves the slat 24 relative to the wing body 50 between retracted, partially extended and fully extended positions.

As best shown in FIGS. 5 and 6, the rack 102 of the aircraft flight control surface actuation monitoring system 100 may be fixedly connected to, and may move with, the track 80 of the wing 16. For example, mechanical fasteners 120, such as screws, bolts, rivets or the like, may be used to connect the rack 102 to the track 80. However, other connection techniques, such welding, brazing, bonding, adhering and the like, may be used without departing from the scope of the present disclosure. Alternatively, the rack 102 may be integral with the track 80 (e.g., the rack 102 and the track 80 may be formed as a single monolithic body).

In one particular construction, the rack 102 may be connected to the track 80 such that the rack 102 faces generally downward. Without being limited to any particular theory, it is believed that configuring the rack 102 to face downward may advantageously utilize the force of gravity to inhibit the accumulation of debris on the rack 102.

The rack 102 of the aircraft flight control surface actuation monitoring system 100 may have a shape that closely corresponds to the shape of the track 80 of the wing 16. For example, if the track 80 is straight (linear), then the rack 102 may be straight (linear). If the track 80 is curved (curvilinear), then the rack 102 (particularly, longitudinal axis L (FIG. 7)) may assume a substantially similar curvature. Therefore, the rack 102 may travel in a substantially similar path as the travel path P (FIG. 3) of the track 80.

While the rack 102 of the aircraft flight control surface actuation monitoring system 100 moves during actuation of the slat 24, the pinion 104 and associated rotation detector 106 may be held stationary within the wing body 50. For example, the pinion 104 and associated rotation detector 106 may be mounted to the leading edge rib 62 of the wing body 50. The pinion 104 may be mounted to the leading edge rib 62 and the rack 102 may be connected to the track 80 such that there is engagement between the rack 102 and the pinion 104, thereby allowing the rotation detector 106 to detect a signal indicative of the displacement of the track 80.

In one alternative configuration, while not shown, the pinion 104 (and associated rotation detector 106) of the aircraft flight control surface actuation monitoring system 100 may move during actuation of the slat 24 (e.g., the pinion may be connected to the track 80), while the rack 102 may be held stationary within the wing body 50 (e.g., the rack 102 may be mounted to the leading edge rib 62). Other alternative configurations are also contemplated.

Accordingly, the disclosed aircraft flight control surface actuation monitoring system 100 may facilitate monitoring the position and movement of the track 80, such as during actuation of the associated flight control surface (slat 24). A loss may occur when no movement is detected by the rotation detector 106 despite an attempt by the actuation system 86 to actuate the slat 24. When each track 80 associated with a given slat 24 is provided with an associated aircraft flight control surface actuation monitoring system 100, a skew may occur when the movement detected by one rotation detector 106 is asynchronous with the movement detected by another, related rotation detector 106.

Figure 8:
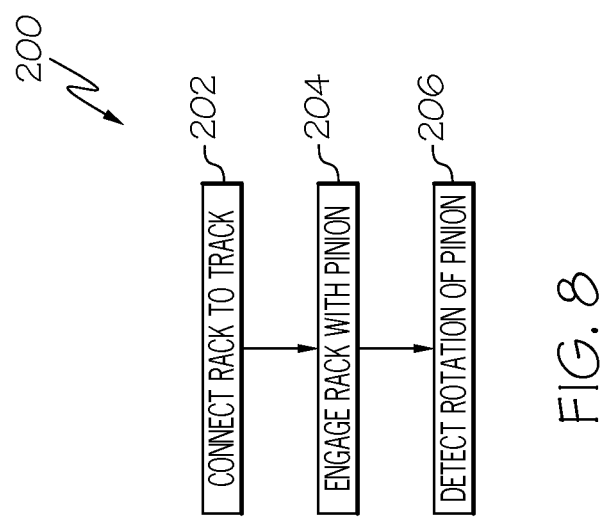
FIG. 8 is a flow diagram depicting one embodiment of the disclosed aircraft flight control surface actuation monitoring method.

Referring to FIG. 8, also disclosed is an aircraft flight control surface actuation monitoring method, which is generally designated 200. The method 200 may be used to monitor actuation of a flight control surface, such as a slat 24 (FIG. 1), on an aircraft 10 (FIG. 1). The slat 24 may be connected to a track 80 (FIG. 2), which may move the slat 24 between at least a retracted position (see FIG. 2) and an extended position (see FIG. 3).

The method 200 may begin at Block 202 with the step of connecting the rack 102 (FIG. 7) of an aircraft flight control surface actuation monitoring system 100 (FIG. 7) to the track 80 (FIG. 2). The rack 102 may include teeth 114. The connection between the rack 102 and the track 80 may be made with mechanical fasteners 120, as shown in FIG. 5, or by other alternative means.

At Block 204, a pinion 104 (FIG. 7) may be engaged with the rack 102 (FIG. 7) of the aircraft flight control surface actuation monitoring system 100 (FIG. 7). The pinion 104 may include teeth 116 sized and shaped to engage the teeth of the rack 102. The pinion 104 may rotate about an axis A (FIG. 7) of rotation in response to movement of the rack 102 along the longitudinal axis L (FIG. 7) of the rack 102.

At Block 206, the rotation of the pinion 104 (FIG. 7) about the axis A (FIG. 7) of rotation may be detected. The detected rotation of the pinion 104 may be indicative of the movement of the track 80. For example, a rotation detector, such as a rotary variable differential transformer, may be operatively connected to the pinion 104 to detect the rotation. However, various techniques may be used to detect the rotation of the pinion 104 in response to movement of the track 80 and, thus, the rack 102.

Accordingly, the disclosed aircraft flight control surface actuation monitoring method 200 may facilitate monitoring the position and movement of a track 80, such as during actuation of the associated flight control surface (slat 24). A loss may occur when no movement is detected despite an attempt by the actuation system 86 to actuate the slat 24. When each track 80 associated with a given slat 24 is being monitored, a skew may occur when the movement of one track is asynchronous with the movement of another, related track.

Although various embodiments of the disclosed aircraft flight control surface actuation monitoring system and method have been shown and described, modifications may occur to those skilled in the art upon reading the specification. The present application includes such modifications and is limited only by the scope of the claims.

What is claimed is:

1. An aircraft comprising:
a flight control surface;
a track connected to said flight control surface, wherein said track moves said flight control surface between at least a retracted position and an extended position;
an actuation system that moves said track, wherein said actuation system comprises a first rack engaged with a first pinion, wherein one of said first rack and said first pinion is connected to said track; and
a monitoring system for monitoring the movement of said track by said actuation system, said monitoring system comprising:
a second rack engaged with a second pinion, wherein said second pinion is rotatable about an axis of rotation in response to movement of said second rack relative to said second pinion, and wherein one of said second rack and said second pinion is fixedly connected to said track; and
a rotation detector operatively connected to said second pinion,
wherein said first rack has a first tooth spacing between adjacent teeth thereof, wherein said second rack has a second tooth spacing between adjacent teeth thereof, wherein said first tooth spacing is greater than said second tooth spacing.

2. The aircraft of claim 1 wherein said second rack is elongated along a longitudinal axis.

3. The aircraft of claim 2 wherein said longitudinal axis is curvilinear.

4. The aircraft of claim 1 wherein said second rack is connected to said track by at least one mechanical fastener.

5. The aircraft of claim 1 wherein said rotation detector comprises a rotary variable differential transformer.

6. The aircraft of claim 1 further comprising a guide, wherein said second rack is positioned between said guide and said second pinion.

7. The aircraft of claim 1 wherein said flight control surface is a slat.

8. The aircraft of claim 1 further comprising a wing comprising a leading edge rib, wherein said flight control surface is a slat, and wherein said track moves said slat relative to said leading edge rib.

9. An aircraft comprising:
a flight control surface;
a track connected to said flight control surface, wherein said track moves said flight control surface between at least a retracted position and an extended position;
an actuation system that moves said track; and
a monitoring system for monitoring the movement of said track by said actuation system, said monitoring system comprising:
a rack engaged with a pinion, wherein said rack and said pinion are separate from said actuation system, wherein said pinion is rotatable about an axis of rotation in response to movement of said rack relative to said pinion, and wherein said rack is rigid and fixedly connected to said track; and
a rotation detector operatively connected to said pinion.

10. The aircraft of claim 9 wherein said rack is elongated along a longitudinal axis.

11. The aircraft of claim 10 wherein said longitudinal axis is curvilinear.

12. The aircraft of claim 9 wherein said rack is connected to said track by at least one mechanical fastener.

13. The aircraft of claim 9 wherein said rotation detector comprises a rotary variable differential transformer.

14. The aircraft of claim 9 further comprising a guide, wherein said rack is positioned between said guide and said pinion.

15. The aircraft of claim 9 wherein said flight control surface is a slat.

16. The aircraft of claim 9 further comprising a wing comprising a leading edge rib, wherein said flight control surface is a slat, and wherein said track moves said slat relative to said leading edge rib.

17. A method for monitoring actuation of a flight control surface, said method comprising:

initiating a movement of a track connected to a flight control surface by way of an actuation system;
whereby said movement of said track initiated by said actuation system causes a corresponding movement of a rack that is rigid, separate from said actuation system, and fixedly connected to said track;
whereby said movement of said rack, which was caused by said movement of said track initiated by said actuation system, causes a corresponding rotation of a pinion engaged with said rack; and
detecting said rotation of said pinion.

18. The method of claim 17 wherein said detecting step comprises operatively coupling a rotary variable differential transformer to said pinion.

19. A method for monitoring actuation of a flight control surface, said method comprising:
providing a track that is connected to a flight control surface and that is engaged by an actuation system that moves said track and, thus, moves said flight control surface between at least a retracted position and an extended position;
fixedly connecting a rigid rack that is separate from said actuation system to said connected and engaged track;
engaging a pinion with said rack, wherein said pinion is rotatable about an axis of rotation;
moving said track using said actuation system, thereby causing a corresponding movement of said rack fixedly connected to said moving track, and thereby causing a corresponding rotation of a pinion engaged with said rack; and
detecting said rotation of said pinion.

20. The method of claim 19 wherein said detecting step comprises operatively coupling a rotary variable differential transformer to said pinion.

* * * * *